United States Patent [19]

Wech

[11] Patent Number: 4,820,249
[45] Date of Patent: Apr. 11, 1989

[54] MULTIPLE SEAM FORMING APPARATUS FOR CONTINUOUSLY RUNNING WEBS

[75] Inventor: Robert J. Wech, Green Bay, Wis.

[73] Assignee: Amplas, Inc., Green Bay, Wis.

[21] Appl. No.: 158,420

[22] Filed: Feb. 22, 1988

[51] Int. Cl.[4] .................. B31B 1/64; B31B 23/86
[52] U.S. Cl. .................... 493/192; 493/193; 493/208; 493/225; 493/393; 493/394; 493/471; 493/474; 493/475; 156/582; 156/583.1; 29/125
[58] Field of Search ............ 493/192, 193, 194, 195, 493/196, 197, 205, 206, 208, 225, 381, 386, 390, 393, 394, 470, 471, 474, 475; 156/582, 583.1, 583.4; 29/125

[56] References Cited

U.S. PATENT DOCUMENTS

| | | | |
|---|---|---|---|
| 3,644,163 | 2/1972 | Schwarzkopf et al. | 156/583.4 |
| 3,752,042 | 8/1973 | Castille | 493/475 |
| 4,030,960 | 6/1977 | Pratt | 493/393 |
| 4,037,769 | 7/1977 | Meyers | 29/125 |
| 4,099,487 | 7/1978 | Wouters | 29/125 |
| 4,213,031 | 7/1980 | Farber | 156/582 |
| 4,308,087 | 12/1981 | Johnson | 493/192 |
| 4,380,446 | 4/1983 | Dickson et al. | 493/208 |
| 4,397,072 | 8/1983 | Otthofer | 29/125 |
| 4,478,672 | 10/1984 | Precht | 156/582 |
| 4,664,649 | 5/1987 | Johnson et al. | 493/232 |
| 4,721,502 | 1/1988 | Herrington | 493/193 |

Primary Examiner—Frederick R. Schmidt
Assistant Examiner—William E. Terrell
Attorney, Agent, or Firm—Andrus, Sceales, Starke & Sawall

[57] ABSTRACT

A draw tape bag apparatus passes a web of plastic material having edge notched hems in the opposite edges to receive closing tapes. A hem sealer unit seals the folded layers of the web longitudinally of the folded edge to form the hem. The sealer unit includes a drum unit rotatably mounted on a shaft. The drum unit includes first and second drum parts having coaxial peripheral surfaces. A heat concentrating and release tape is secured to each drum part. The adjacent intermediate ends of the drum parts have telescoping and mating fingers and receses. Separate adjustment screws are coupled to the machine frame adjacent each drum part. Each screw is coupled to the outer race of a ball bearing secured to the adjacent outer end wall of the drum part. The setting of the screw accurately locates the heat concentrating tape axially of the drum. Hot air nozzles are mounted externally to the drum parts in alignment with the tapes and heat the web passing over the tapes to heat seal the web layers in the hem.

14 Claims, 2 Drawing Sheets

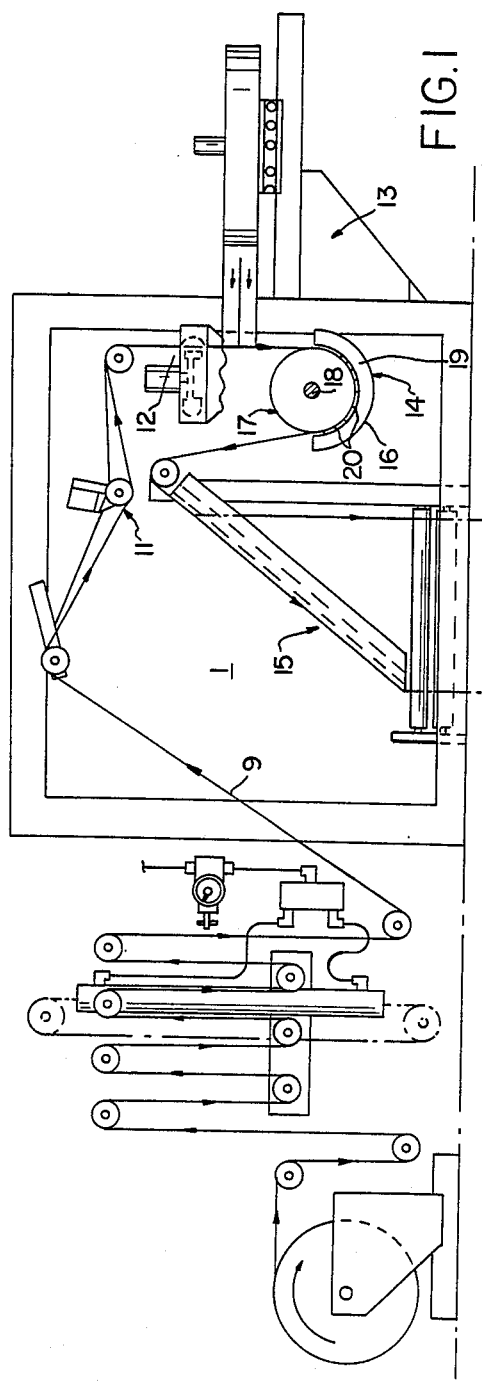
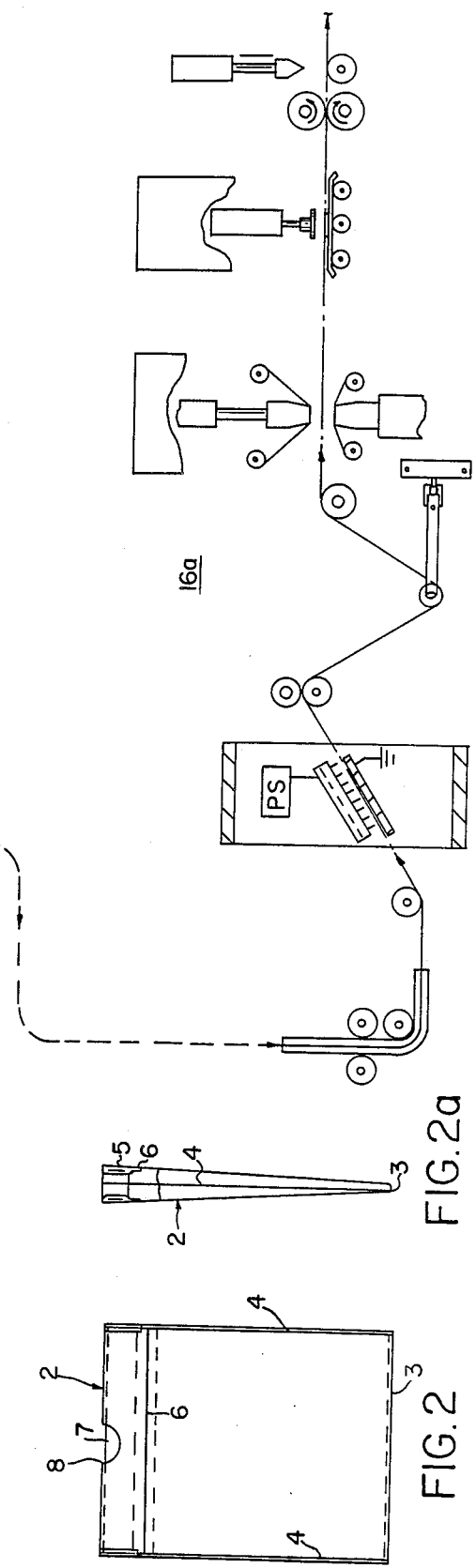

U.S. Patent Apr. 11, 1989 Sheet 2 of 2 4,820,249
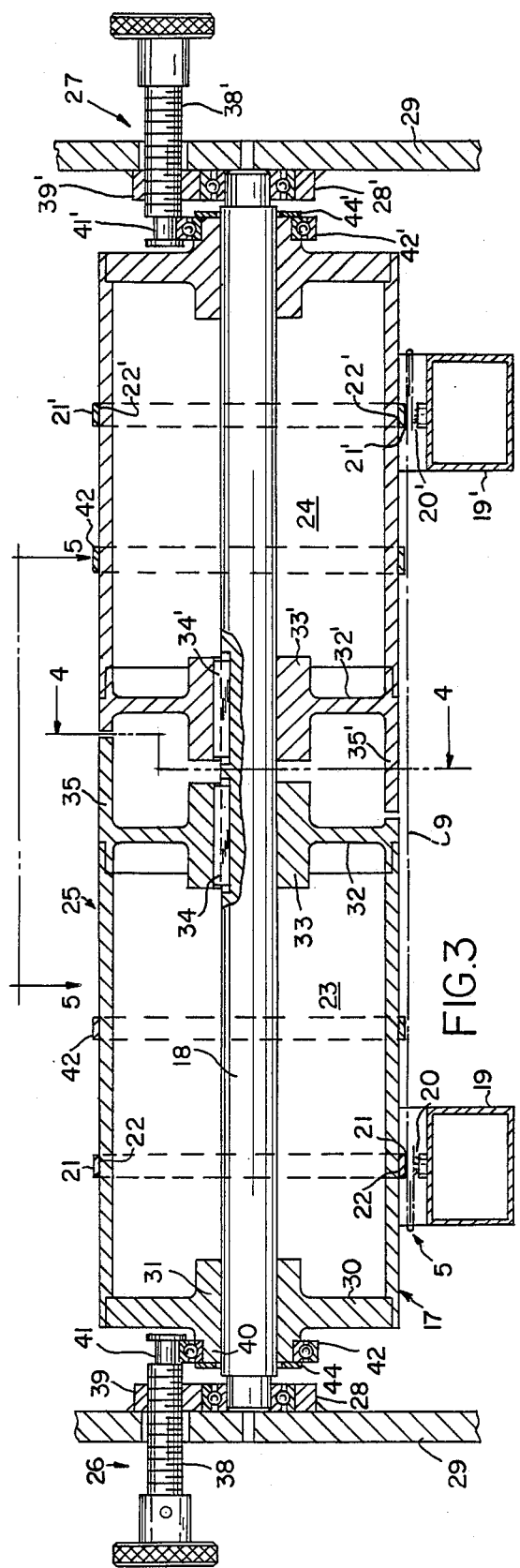
FIG.3
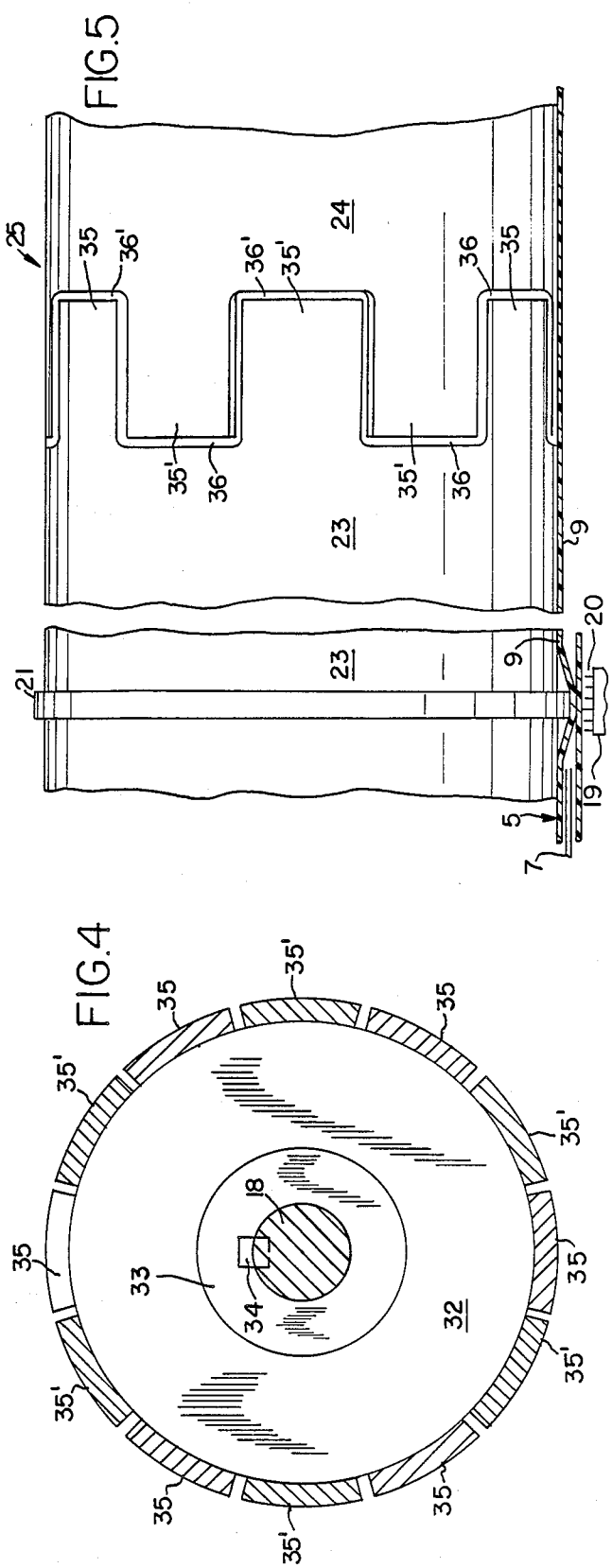
FIG.5
FIG.4

MULTIPLE SEAM FORMING APPARATUS FOR CONTINUOUSLY RUNNING WEBS

BACKGROUND OF THE PRESENT INVENTION

The present invention relates to a hot seal seam forming apparatus for forming a plurality of laterally spaced thermal seams in a continuously moving pliable web and particularly to the forming of the hem seals in a draw tape bag.

Plastic and like webs are processed in high speed automated machines to form various products. A draw tape bag forming apparatus is disclosed in the copending application Ser. No. 158,418 of Robert J. Wech entitled Draw Tape Bag Forming Method and Apparatus, filed on even date herewith and assigned to a common assignee herewith In forming the draw tape bag from a flat plastic web, the web has the edges folded to form the hem. The hem is sealed by passing the folded edge over a sealing drum having concentrated circumferential heat lines aligned with the inner edge portion of the hems. In passing over the heating drum, the seam is continuously formed in the continuously uninterrupted moving web. A practical seal unit is shown in U.S. Pat. No. 4,664,649 which issued May 12, 1987 wherein a drum is provided with a tape strip on the drum face aligned with the desired seal location. The tape strip stretches and raises the hemmed web as it moves over the taped drum. Semi-circular hot air nozzle units are aligned one each with each tape strip. Each nozzle unit generates a continous blast of hot air directed onto the drum and the web passing there between. The hot air rapidly causes the web to melt or become molten and forms a line weld seam in alignment with the tape strip. In the high speed forming of draw tape bags, the precise alignment of the folded hem is difficult to maintain. Further, different width bags require adjustment of the tape strips on the drum. The tape strip is releasably secured to the drum face to permit location on the drum in accordance with the location of the hems and particularly the hem seal lines. The adjustment of the tape strip requires shut down of the machine.

The positioning of the small narrow tape, even in an initial set up may require two or more attempts to properly align the narrow tape strips for system optimum operation. Although the hem size can be enlarged to allow for normal web tolerances, other factors are often adversely effected in a draw tape bag area. For example, if the hem size is enlarged, the positioning of the tape strip can vary with respect to each other and results in some misalignment. This effects the strength of the bond between the straps and the bag elements with a consequent variation in the overall carrying ability of the draw tape bag. The tape strip material of course may also be frequently discarded during a repositioning setup or adjustment, resulting in not only excessive down time but strip and bag scrap.

Although the initial set up can be provided in a reasonable fashion, the necessity of slight adjustment during a run often arises. To shut down the machine at that time is not only costly but inconvenient.

There is a demand and need for a more cost and time efficient apparatus for adjusting the alignment of the heat seal unit and the web.

SUMMARY OF THE PRESENT INVENTION

The present invention is particularly directed to an adjustable heat seal unit for multiple seam forming on a continuous flat web member and particularly to such an apparatus which can be readily constructed with present day technology and permits the adjustment of the heat seal unit without shut down of the draw tape bag forming machine. Generally in accordance with the present invention, the heat unit includes a drum structure formed of multiple drum parts mounted in end-to-end relation and having a intermediate telescopic meshing support surfaces. Each of the separate drum parts is rotatably mounted on a shaft unit for rotation of the drum as a single integrated unit. Each drum part however is separately mounted on the shaft in suitable bearings for sliding movement on the shaft. An axial adjustment mechanism is coupled to each drum part and is operable to selectively move the corresponding drum part for realigning of a raised seal portion relative to the web. A heat unit aligned with the raised seal portion generates a sufficiently wide heat source that slight adjustment required with the machine running can be readily completed without moving of the heat source. The heat source is preferably mounted to allow adjustment where necessary or desired. When a significant change is made in the size of the web or the spacing of the seals, the total machine shut down will normally be required and the heat source is adjusted with the other components of the draw tape forming machine.

More particularly in a preferred construction, the sealing drum is formed as a two part drum including complementing telescoped first and second drum parts mounted on the idler shaft in end-to-end relation. The drum parts are identically constructed and each includes a tape strip encircling the corresponding drum part for alignment with hem seal line. Each drum part includes axially spaced bearing mounted on the idler shaft and slidably supporting the drum part. A key or other unit fixes the drum part to the idler shaft for rotation therewith. Both seal drum half parts are similarly thereby rotationally fixed to the single idler shaft and move as a single integrated drum. The adjacent center of the drum parts are formed with meshing circumferential fingers and recesses to establish an essentially continuous surface to the web.

Each drum part includes an adjustment bearing secured to the outer end of the drum part, such as an outer hub member. A suitable mechanical operator such as an adjustment screw is mounted in the frame and coupled to the outer race of the adjustment bearing for moving of the drums axially of the idler shaft unit. Once appropriately adjusted, the screw is locked in place to hold the drum part with the sealing strip appropriately located in alignment with the hem seal line. The central interlocking fingers and recesses at the center provide completely adequate support for the continuous and uninterrupted movement of the web around the drum while permitting the necessary limited axial adjustment of the drums and the tape strips thereon.

The present invention thus provides a simple, reliable and an effective means for forming of the hem seal in a draw tape bag making machine and in particular permits efficiency and maximum production with continuous and uninterrupted flow of the web.

BRIEF DESCRIPTION OF THE DRAWINGS

The drawings furnished herewith generally illustrate the best mode presently contemplated for carrying out the invention and are described hereinafter.

In the drawings:

FIG. 1 is a view of a hem forming unit incorporating a hem sealing unit constructed in accordance with the present invention;

FIGS. 2 and 2a are respectively a front and side view of a bag formed with the unit of FIG. 1;

FIG. 3 is a longitudinal section through a sealing drum shown in FIG. 1;

FIG. 4 is an enlarged vertical section taken generally on line 4—4 of FIG. 3; and FIG. 5 is an enlarged fragmentary plan view taken generally on line 5—5 of FIG. 3.

DESCRIPTION OF THE ILLUSTRATED EMBODIMENT

Referring to the drawings and particularly to FIG. 1, a hem folding and forming unit 1 of a draw tape bag forming apparatus is shown for constructing of a draw tape bag 2 from a flat sheet of pliable material such as polyethylene plastic. The bag 2 is formed of a single integral plastic web and includes opposite similar plastic sidewalls having an integral bottom edge 3. The side edges of the bag are formed by heat sealed edge seams 4. The top or open end of the bag is formed with a hem 5 integral with each side wall. The inner wall of the hem 5 is formed by folding the sidewall inwardly and joining the hem walls by a heat sealed seam 6 to define an internal tubular channel or tubular portion. Similar draw tapes 7 are located in each side hem 6 with the opposite ends of the tapes sealed to the side edges of the bag. Each hem has an opening 8 generally centrally of the sidewall and centrally between the edge seams 4. Pulling outwardly on the draw tapes 7 causes the open end of the bag 2 to collapse and close.

A particularly satisfactory method of manufacture of a draw tape bag is disclosed in the above co-pending application of Robert J. Wech. As more fully disclosed in that application, the draw tape bag 2 is formed from a flat web 9 which includes a hem folding and forming unit 1 in which the web is sequentially passed through a hem folding station 11, a notching station 12, a tape inserting station 13 and a hem sealing station 14. The hemmed web is folded on the center line at a folding station 15 to align the hems 5 and the folded web is passed through an edge sealing and severing unit, not shown herein, to form the side edges at appropriate spaced transverse lines to complete the bags. The hem folding, notching and tape insertion apparatus as well as units for forming of the bag may be of any desired construction. The present invention is particularly directed to a hem seal forming unit 16 at station 14 to form sealed hems moving in a continuous and uninterrupted paths through station 14. Further description of the other units or portions of the machine are not therefore included other than as necessary to describe the illustrated embodiment of the hem sealing unit 16. The folded web is passed through a bag making machine 16a as more fully disclosed in the inventor's previously identified application.

The hem sealing unit 16 forms the thermal seam 6 along the base of the hem 5 as the web 9 runs in a continuous and uninterrupted manner through the draw tape bag forming machine.

Generally, the hem sealing unit 16 includes a common rotating drum unit 17 supporting the open hemmed web 9. The drum unit 17 is mounted for essentially free rotation on a supporting idler shaft 18. Semicircular hot air nozzles 19 are mounted encircling the drum unit 17 in alignment with the location of the two hem seams 6 in the web 9. As the edge folded web 9 passes between the drum unit 17 and the nozzle 19, hot air 20 heats the web sufficiently to create a fusion connection between the abutting hem layers in accordance with well known heat sealing phenomena.

As more clearly shown in FIGS. 3-5, a pair of small and relatively narrow low friction plastic tape strips 21 are secured on the drum unit 17 in alignment with the nozzles 19, and particularly is placed on the drum unit in precise alignment with the hem seal lines 6. The tape strip raises and stretches the web 9 as it moves beneath the nozzle 19 and results in an improved seam. The tape is specially selected to prevent sticking of the heated web 9 to the tape 21 and thus provide positive and unrestricted release of the web 9 leaving the drum unit 17. Typically, the tape is formed of Teflon or the like and provides a highly satisfactory release of the web.

The tape strip 21 is secured to the drum by a suitable releasable adhesive 22 to permit replacement and moving of the tape strip for different sized bags, adjustment to compensate for the path of the web through the machine and the like.

Although shown as a hot air heating source, any other suitable heating elements, such as a sliding contact sealer, a radiant heater or the like may also be employed to heat the web layer aligned with the tape strip 21.

For any given bag construction, the tape strip 21 is located on the drum unit 17 in accordance with the hem seams 6. During any given production run, it may be necessary to make some slight adjustment in the location of the seams 6 to ensure accurate sealing and location of the draw tapes 7 within the hems 5 and the like. The present invention permits individual and separate positioning of the sealing tape strip 21 relative to the web 9 without removal from the drum unit 17.

Generally, the drum unit 17 is formed as a split drum having first and second drum parts 23 and 24 which include overlapping central surfaces 25 to maintain an essentially continuous supporting surface to the web 9. The opposite drum parts 23 and 24 of the drum unit 17 are of the same construction and mounted on the idler shaft 18 for rotation therewith. In addition, however, each of the drum parts 23 and 24 is specially mounted for sliding movement on the idler shaft 18 and connected to similar individual mechanical adjustment units 26 and 27 for selectively positioning and locking of the drum parts axially on the shaft 18. The illustrated rotating drum unit 17 is thus symmetrically formed about the center line of the machine and correspondingly mounted in position. For purposes of description, the construction and mounting of the first drum part 23 of the drum unit 17 is described in detail with corresponding elements of the other or second part of the drum unit identified by corresponding primed numbers.

Referring particularly to FIGS. 2 and 3, the idler shaft 18 is shown as a single shaft member, the opposite ends of which are mounted in bearings 28 in the opposite sides of the machine frame 29. The drum unit 17 is formed with a smooth outer surface for low friction guiding of the web 9 around drum unit 17 and through the heating nozzles 19.

The drum part 23 is a cylindrical hollow member secured to an outer end bearing wall 30. A supporting sliding bearing 31 is provided in the end wall 30 of the drum part 23. The drum part 23 is slidably journalled on the idler shaft 18. The center portion of the drum part 23 includes an intermediate bearing wall 32 including a sleeve bearing 33 slidably mounted on the shaft 18. The center bearing 33 is keyed to the shaft as by an elongated key 34 to fix the drum part 23 to the idler shaft 18 for free rotation therewith.

The inner bearing 33 is spaced inwardly from the inner end of the drum part 23. The inner end of the drum part 23 is formed with a series of surface drum fingers or projections 35 equicircumferentially spaced about the drum. The circumferentially spaces 36 of the projections 35 equals the width of the projections. The other drum part 24 is similarly formed with alternately located projections 35'. The projections and recesses of the two drum parts 23 and 24 mesh with each other, as shown in FIGS. 3 through 5 and are held in fixed circumferential relationship by the keys 34 and 34' in the respective drum bearings and the idler shaft 18. Although circumferentially fixed and rotating as a single drum, each drum part 23 and 24 is free to slide on the idler shaft 18.

The adjustment unit 26 is secured to the machine frame 29 and to the drum part 23 for axially positioning thereof and locking of the drum part in position with the tape strip 21 in precise alignment with the desired hem seam 6. The illustrated positioning and locking unit 26 includes a threaded screw 38 threaded into a fixed washer or tube 39 on the machine frame 29. The tube 39 is rigidly affixed to the machine frame 29 in alignment with the end wall 30 of the split drum part 23. The adjusting screw extends inwardly from the tube 39 into overlying relationship to an extended exterior hub 40 of the drum bearing 31. The inner end of the screw 38 is formed with an annular notch or recess 41 aligned with and mating with a ball bearing unit 42 secured on an outer stepped portion of the bearing hub 40. A clamping ring 44 is secured to the face of the hub 40 and firmly clamps the inner race of the ball bearing unit 42 to the hub. The drum part 23 is thus free to rotate with the idler shaft 18 independently of the connection to the adjusting screw 38, and the screw axially positions the bearing and interconnected split drum part 23 on the idler shaft 18. A corresponding axial adjustment of the location of the tape strip 21 position is made. The axial adjustment of course corresponds to the appropriate lateral adjustment with respect to the web 9 and particularly the hem seal 6 and permits limited adjustment with respect thereto. The lead screw 38 permits fine adjustment of the tape strip 21 and thereby accurate alignment with the hem seal 6. Because of the release characteristics of the components, the adjustment can be made while the web 9 is passing through the heat sealing unit 16. This permits rapid and accurate positioning of the strip 21 and eliminates the usual down time and normal waste product and tape waste associated with more conventional manual positioning controls.

The apparatus may be set up to form a series of bags of different depths. The distance between the hems seams in the web would then be significantly different for each size of bag. Each drum may be provided with one or more additional pair of strips 42 or the like with each pair located for a particular bag depth.

The split drum permits the separate and independent positioning of the opposite halves of the split drum. This construction avoids any problem which would arise if the adjustment of a complete drum to correct a given hem misalignment on one seam 6 only resulted in misalignment on the other seam of the opposite hem.

The present invention thus provides simple, reliable and effective means of making high quality draw tape bags and the like.

Various modes of carrying out the invention are contemplated as being within the scope of the following claims and particularly pointing out and distinctly claiming the subject matter which is regarded as the invention.

I claim:

1. A hem sealer apparatus sealing of a hem formed in a plastic web having the edges folded inwardly to form on open hem for forming a heat generated seam extending longitudinally of the folded edge to seal the hem in the forming of draw tape bags, comprising a sealing drum unit for receiving of said hem folded web passing therearound with said edge folded on itself to form an open hem, heating means for heating a longitudinal line of said web moving around said drum and including a heat control element on said drum unit, said drum unit including first and second drum members mounted in coaxial alignment together defining a single essentially continuous drum surface for supporting of said web, and adjustable means for axially positioning of said drum members to adjust the axial length of said drum unit for controlling the location of said heat central element.

2. The apparatus of claim 1 wherein said heat control element includes first and second heat concentrating strips secured one to each of said drum members, and said adjustable means is coupled to both of said drum members for individual adjustment of each drum member.

3. The apparatus of claim 1 wherein said heating means includes an external heat source aligned with said control element, said control element being a circumferential strip secured to the drum member, said heat source creating a heat pattern axially extended to encompass the adjustment provided by said adjustable means.

4. The apparatus of claim 1 wherein said first and second drum members include meshing axial fingers and recesses to define the generally continuous web supporting surface.

5. In a draw tape bag forming apparatus wherein the bag is formed from a single folded web of plastic material having hems formed in the opposite edges of the folded web to provide an encircling hem at the upper open end of the bag, said hems defining tubular portions adapted to receive tapes and finger holes in said hems providing access to said tapes, the improvement in a heat seam forming unit for heat sealing the inner edge portion of the folded edge portion of the inwardly folded web to complete said seam, said forming unit comprising an idler shaft mounted for free rotation, a drum unit mounted on said idler shaft and including first and second drum members having coaxial peripheral surfaces and mounted in end-to-end relation on said shaft to define a single drum supporting surface, heat concentrating element on each of said drum members, the adjacent intermediate ends of said drum members being formed with telescoping and mating finger and recess portions, each of said fingers on each drum member having a corresponding axial length and a circumferential width corresponding to the width of circumferential recesses on the other drum member, means rotatably fixing said drum members to said idler shaft with said fingers on one drum member aligned with and telescopic into the corresponding recesses of the opposite drum member, a machine frame, first adjustment means coupled to said machine frame and to said first drum member for axial adjustment of said first member on said idler shaft for accurately located of said heat concentrating element, a second adjustable means connected to said machine frame and secured to the outer end of the second drum member and operable to axially position said second drum member on said idler shaft for corresponding positioning of said second heat concentrating element, heat generating means mounted externally to said drum members and located in alignment with said heat concentrating elements and operable to generate a heat pattern over said elements to heat said web passing over said heat generating means and effect an effective heat seal of said web to join overlying web layers of said hem aligned with heat concentrating elements.

6. A hem sealer apparatus for sealing of the hem formed in a web having the edges folded inwardly to form an open hem extending longitudinally of the folded edge, comprising a sealing drum unit for receiving of said web passing therearound with said open hem, heating means for heating a longitudinal line of said open hem moving around said drum and including a heat control means on said drum, said drum unit including a plurality of drum, members mounted in coaxial alignment together defining an essentially continuous drum surface for supporting of said web, and said heat control means on at least one of said drum members, and adjustment means for axially positioning of said drum member having said heat control means for individually controlling the location of said heat control means by adjusting the axial length of said drum unit.

7. The apparatus of claim 6 wherein said heat control means includes a plurality of paired heat control elements, each pair of heat control elements being located for alignment with different longitudinal lines of said web.

8. The apparatus of claim 6 wherein said heat control means is a strip encircling said drum member.

9. The apparatus of claim 6 including an idler shaft means mounted for free rotation, said drum members mounted on said idler shaft and including first and second end drum members having coaxial peripheral surfaces and mounted in end-to-end relation on said shaft to define a single drum supporting surface, and said heat control means including encircling strip elements one on each of said drum members.

10. The apparatus of claim 9 wherein the adjacent intermediate ends of said drum members being formed with telescoping and mating finger and recess portions, each of said fingers on each drum member having corresponding axial length and a circumferential width corresponding to the width of circumferential recesses on the other drum member, and means rotatably fixing said drum members to said idler shaft with said fingers on one drum member aligned with and telescopic into the corresponding recesses of the opposite drum member.

11. The apparatus of claim 10 wherein said adjustment means is coupled to a machine frame and to said first drum member for axial adjustment of said first drum member on said idler shaft for accurately located of said strip member, a second adjustment means connected to said machine frame and secured to the outer end of said second drum member and operable to axially position said second drum member on said idler shaft for corresponding positioning of said second strip element.

12. The apparatus of claim 11 wherein said heating means includes external heating elements aligned with said heat strip elements and operable to generate a heat pattern over said elements to heat said web passing over said elements.

13. A method for producing a draw tape bag wherein the bag is formed from a flat sheet of plastic having folded web hems formed in the opposite side edges and a finger hole provided in each hem for access to said tape, said method including the steps of feeding a flat sheet of said plastic sheet web with the edges folded inwardly to define an open hem, on each edge continuously introducing a tape within said open hems, passing said taped open hems over a split heating drum having first and second drum parts each including a heat concentrating means aligned with one of said hems for forming of a heat seam in said aligned hems, heating of said hem portion in alignment with said heat concentrating means to form longitudinal seams, and individually positioning said drum parts to adjust the axial length of said drum with said web passing over said drum to accurately ad precisely align said heat concentrating means with the corresponding hem for accurate forming of the longitudinal seam.

14. The method of claim 13 including the step of folding of the hemmed web on a central line to overly said first and second hems with the tape located within each hem, and transversely heat sealing said web on longitudinally spaced areas including said edge areas to form the side edges of a bag.

* * * * *

UNITED STATES PATENT AND TRADEMARK OFFICE
CERTIFICATE OF CORRECTION

PATENT NO. : 4,820,249

DATED : April 11, 1989

INVENTOR(S) : Robert J. Wech

It is certified that error appears in the above-identified patent and that said Letters Patent is hereby corrected as shown below:

Column 6, Line 18, After "forming" insert -- therein --

Column 7, Line 32, After "drum" delete -- , --

Column 8, Line 44, Delete "ad" and substitute therefor -- and --

Signed and Sealed this

Twenty-fourth Day of July, 1990

Attest:

HARRY F. MANBECK, JR.

Attesting Officer

Commissioner of Patents and Trademarks